United States Patent
Yoo et al.

(10) Patent No.: US 9,653,921 B2
(45) Date of Patent: May 16, 2017

(54) BATTERY DEVICE AND ENERGY STORAGE SYSTEM INCLUDING THE SAME

(71) Applicant: LSIS CO., LTD., Anyang-si, Gyeonggi-do (KR)

(72) Inventors: Anno Yoo, Seoul (KR); Sehoon Hwang, Seoul (KR)

(73) Assignee: LSIS CO., LTD., Anyang-si (KR)

( * ) Notice: Subject to any disclaimer, the term of this patent is extended or adjusted under 35 U.S.C. 154(b) by 211 days.

(21) Appl. No.: 14/216,280

(22) Filed: Mar. 17, 2014

(65) Prior Publication Data

US 2014/0298063 A1    Oct. 2, 2014

(30) Foreign Application Priority Data

Mar. 26, 2013    (KR) .......... 10-2013-0032040

(51) Int. Cl.
*G06F 1/32* (2006.01)
*H02J 3/32* (2006.01)
*H02M 7/23* (2006.01)
*H02J 7/02* (2016.01)
*H01M 10/48* (2006.01)

(52) U.S. Cl.
CPC ............. *H02J 3/32* (2013.01); *H02J 7/022* (2013.01); *H02M 7/23* (2013.01); *H01M 10/482* (2013.01)

(58) Field of Classification Search
CPC .......... H02J 3/32; H02J 7/022; H01M 10/482; H02M 7/23
See application file for complete search history.

(56) References Cited

U.S. PATENT DOCUMENTS

| 8,654,495 | B2* | 2/2014 | Tinglow | H02J 7/0026 361/91.1 |
| 8,829,716 | B2* | 9/2014 | Tinglow | H02J 7/0016 307/65 |
| 9,112,247 | B2* | 8/2015 | Yamauchi | H01M 10/425 |
| 2010/0079108 | A1* | 4/2010 | Monden | H02J 7/0026 320/116 |
| 2012/0223677 | A1* | 9/2012 | Yamauchi | H01M 10/425 320/116 |

(Continued)

FOREIGN PATENT DOCUMENTS

| JP | 2000-312445 | 11/2000 |
| JP | 2003-244854 | 8/2003 |

(Continued)

OTHER PUBLICATIONS

Japan Patent Office Application Serial Number 2014-061702, Office Action dated Feb. 17, 2015, 3 pages.

(Continued)

*Primary Examiner* — M Elamin
(74) *Attorney, Agent, or Firm* — Lee, Hong, Degerman, Kang & Waimey (57) ABSTRACT

Provided is an energy storage system including: a battery device that is configured from multiple battery unit modules; and a power converting system that is configured to be connected to the battery device and that converts electric power that is applied between an electric power system and the battery device, in which the battery device includes multiple switches, each of which establishes a connection between each of the battery unit modules and the power converting system.

13 Claims, 5 Drawing Sheets

(56) References Cited

U.S. PATENT DOCUMENTS

2012/0274142 A1* 11/2012 Tinglow ............... H02J 7/0026
307/77

FOREIGN PATENT DOCUMENTS

| JP | 2007-280679 | 10/2007 |
| --- | --- | --- |
| JP | 2012-182911 | 9/2012 |
| WO | 2012/114479 | 8/2012 |

OTHER PUBLICATIONS

Japan Patent Office Application Serial Number 2014-061702, Office Action dated Dec. 8, 2015, 7 pages.

* cited by examiner

BATTERY DEVICE AND ENERGY STORAGE SYSTEM INCLUDING THE SAME

CROSS-REFERENCE TO RELATED APPLICATION

Pursuant to 35 U.S.C. §119(a), this application claims the benefit of earlier filing date and right of priority to Korean Application No. 10-2013-0032040, filed on Mar. 26, 2013, the contents of which is incorporated by reference herein in its entirety.

BACKGROUND OF THE DISCLOSURE

1. Field of the Disclosure

The present invention relates to a power converting system having a battery energy storage apparatus and a configuration of a battery, and particularly to a battery device that is capable of operating without any hitch particularly even when a battery device is out of order and of increasing stability of an energy storage apparatus and an energy storage system including the battery device.

2. Background of the Disclosure

A demand for electric power gradually increases with industrial developments and there are ever-increasing gaps between day and night electric power usages, seasonal electric power usages, and daily electric power usages.

For this reason, rapid progress has been made in developing technologies that can reduce peak load by utilizing surplus electric power of an electric power system. Of these technologies, the most typical is associated with a battery energy storage system that stores the surplus electric power of the electric power system in batteries or reversely supplies electric power from the batteries to the electric power system when the electric power system runs short of electric power.

The battery energy storage system stores the surplus electric power that is generated at night, or the surplus electric power that is generated using new renewable energy, such as wind power and sunlight, and supplies the electric power stored in the batteries to the electric power system when the peak load or an accident occurs in the electric power system. Accordingly, the utilization of the new renewable energy stabilizes the unstably-punctuating supply of the electric power from the electric power system, and thus reduces the maximum load and accomplishes leveling-off of the load.

A battery device and an energy storage apparatus including the battery device in the related art are described below referring to FIGS. 1 and 2.

Figure 1:
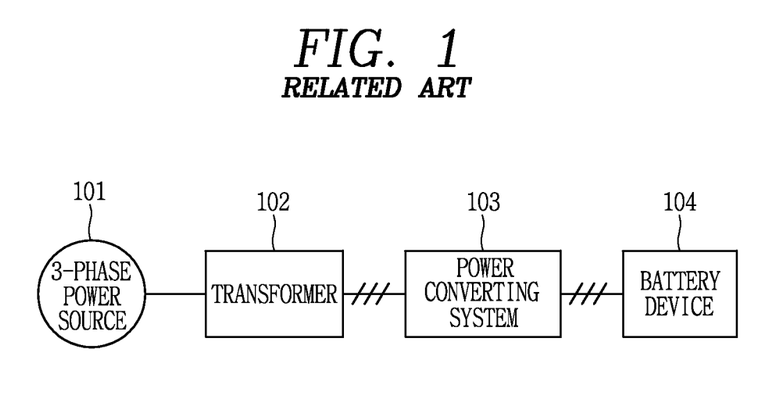
FIG. 1 is a diagram illustrating a configuration of an energy storage apparatus in the related art.

FIG. 1 is a diagram illustrating a configuration of the energy storage apparatus in the related art. FIG. 2 is a diagram illustrating a configuration of the battery device in the related art.

Referring to FIG. 1, the energy storage apparatus includes a 3-phase source 101, a transformer 102, and a power converting system (PCS) 103, and a battery device 104.

The 3-phase source 101 is a 3-phase power source that has a line-to-line root mean square (RMS) of 100V or more. In the 3-phase source 101, the presence or absence of the 3-phase power source is optional.

The transformer 102 is for electrical insulation and for changing voltage to different levels. Installation of the transformer 102 is also optional.

The power converting system 103 is a system that performs power conversion between a direct current (DC) power source, which is a battery, and an input 3-phase alternating current (AC) power source and is configured from a 2 or more-level pulse width modulation (PWM) inverter and an input filter.

The battery device 104 stores or outputs direct current voltage.

Figure 2:
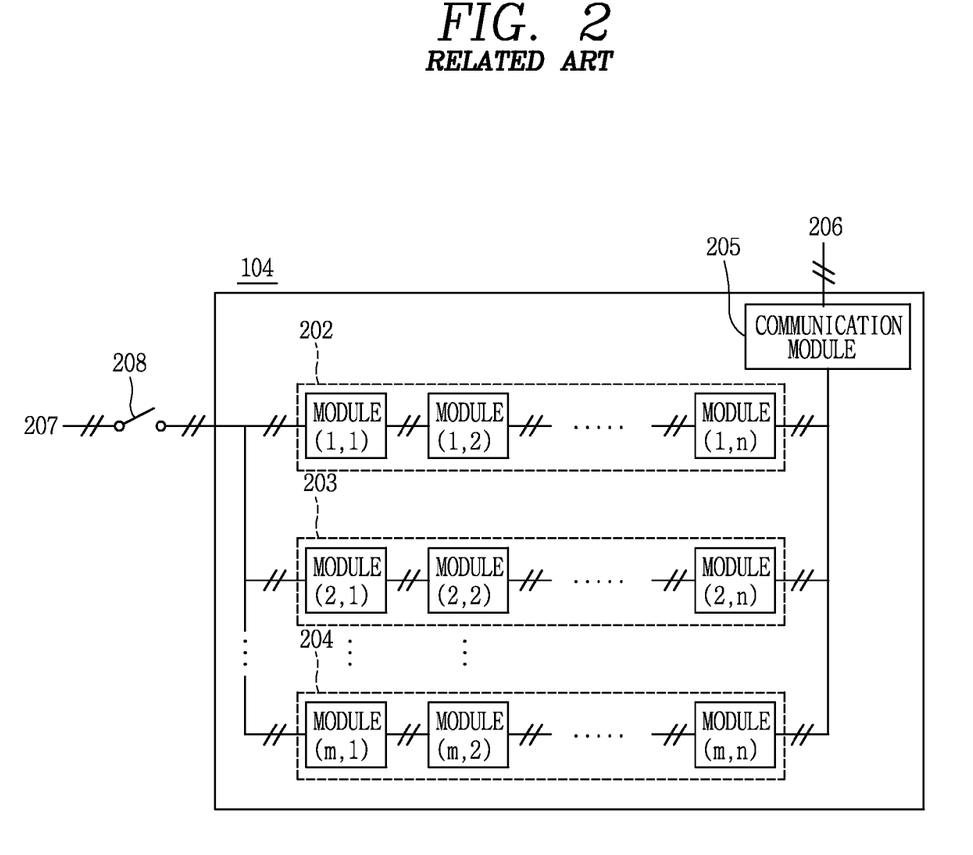
FIG. 2 is a diagram illustrating a configuration of a battery device in the related art.

Referring to FIG. 2, battery unit modules 202, 203, and 204 are connected to one another in series or in parallel. That is, battery cells of each of the battery unit modules 202, 203, and 204 are connected, as one unit, to one another in series or in parallel. The battery unit modules 202, 203, and 204, each of which has this battery cell arrangement, may be connected in series or may be connected in parallel. Accordingly, the batter device 104 as a whole has a structure in which the battery cells are connected with one another in series or in parallel.

A communication module 205 transmits battery information.

A communication line 206 is a communication line for transmitting an output signal of the communication module 205 outside of the battery.

The electric power line 207 is an electric power line over which an output voltage of the battery device 104 is output. A direct current voltage that is generated due to discharging of the battery device 104 is transmitted to the power converting system 103.

A switch 208 is formed between the power converting system 103 and the battery device 104. The switch 208 establishes or releases a connection between the power converting system 103 and the battery device 104.

Through the operation of the switch 104, the power converting system 103 performs a function of supplying to the electric power system a constant amount of electric power that comes from the energy of the battery device 104 or of charging the discharged battery with the energy of the electric power system.

At this point, if a 3-phase generation system of the 3-phase source 101 operates properly, the power converting system 103 properly follows a phase angle of the electric power system and thus outputs the same frequency and the same level of voltage as in the electric power system. Thus, the battery device 104 is discharged to supply the energy to the electric power system or the battery device 104 is charged to absorb the energy of the electric power system.

In this case, it is considered that the energy storage apparatus including the power converting system 103 and the battery device 104 is configured as one current source equivalent circuit.

In addition, if the 3-phase generation system of the 3-phase source 101 is absent, the power converting system 103 operates as a voltage source that outputs a constant voltage and a constant frequency. If an additional energy source is absent in a system in which the 3-phase generation system is not present, the battery device 104 performs only a function of making the energy discharge, and may further include a device for charging the battery in an external manner.

At this point, the energy storage apparatus including the power converting system 103 and the battery device 103 operates as the voltage source.

The power converting system 103 may include an input filter, such as an L filter, an L-C filter, or an L-C-L filter, and may possibly be configured from a 3-phase 2-level PWM inverter or a 3-phase 3-level PWM inverter.

The battery device 104 outputs the direct current voltage in a constant range and transmits pieces of information, such as a charged state of the battery, an operated state of the battery, and the extent with which the battery is discharged, to an energy management apparatus of a high-level control system or to the power converting system 103 through the communication module 205. Thus, a charged/discharged state of the battery device 104 is determined depending on an energy state of the battery.

At this point, if a sign of disorder occurs in the battery device 104, the switch 208 is opened by the energy management apparatus or the power converting system 103, and thus the connection is released between the power converting system 103. Accordingly, the operation of the entire system comes to a stop.

However, in the related art, as described, the power converting system and the battery device are connected to each other through one breaker or one switch. Therefore, if the sign of disorder occurs in a specific unit module, one of the unit modules of the battery, the operation of the entire system comes to a stop. This causes problems in terms of system management. Such problems arise from the configuration of the battery and occur due to the connection of the battery and the power converting system through one switch.

SUMMARY OF THE DISCLOSURE

Therefore, an aspect of the detailed description is to provide a battery device that is capable of separating a unit module in which a sign of disorder occurs from the other unit modules among battery unit modules.

Another aspect of the detailed description is to provide a battery device in which only a unit module in which a sign of disorder occurs, among battery unit modules, can be efficiently replaced.

A further aspect of the detailed description is to provide a battery device that, even though a sign of disorder occurs in a specific unit module among battery unit modules, makes it possible to normally perform managing of a system using the unit modules other than the specific unit module in which the sign of disorder occurs.

To achieve these and other advantages and in accordance with the purpose of this specification, as embodied and broadly described herein, there is provided a battery device including: a case; an electric power terminal that is configured to be formed on one side of the case; multiple unit module mounting portions, which are configured to be formed within the case, and each of which is configured to accommodate a battery unit module; and multiple switches, each of which is configured to be formed between the electric power terminal and each of the multiple unit module mounting portions.

In the battery device, each of the multiple switches may be formed between the electric power terminal and a specific unit module mounting portion and may connect or disconnect lines over which electric power is transmitted and received between the electric power terminal and the specific unit module mounting portion.

The battery device may further include at least one communication module mounting portion that is formed within the case and that is configured to accommodate a communication module and a communication terminal that is formed within the case and that is configured to be connected to the communication module mounting portion.

In the battery device, the communication module mounting portion may be connected to each of the multiple unit module mounting portions and thus forms a communication path.

To achieve these and other advantages and in accordance with the purpose of this specification, as embodied and broadly described herein, there is an energy storage system including: a battery device that are configured from multiple battery unit modules; and a power converting system that is configured to be connected to the battery device and that converts electric power that is applied between an electric power system and the battery device, in which the battery device includes multiple switches, each of which establishes a connection between each of the battery unit modules and the power converting system.

In the energy storage system, the battery device may be configured to be connected to the multiple battery unit modules and may include a communication module that obtains battery-status information on each of the battery unit modules and transmits the obtained status information to the outside.

In the energy storage system, the power converting system may receive the battery-status information on each of the battery unit modules that is obtained through the communication module and may control switched states of the multiple switches, based on the battery-status information.

In the energy storage system, the power converting system may control the switch that is connected to the battery unit module in which a sign of disorder occurs, among the multiple battery unit modules, in such a manner as to open the switch.

In the energy storage system, the multiple battery unit modules that make up the battery device may be separated, by partitions, from one another.

According to the embodiment of the present invention, the battery is divided into modules in terms of capacity for installation, and the switch or the breaker is installed for each of the modules. Thus, even though the disorder occurs in a specific battery unit module included in the battery device, the operation of the energy storage system can operate without any hitch in a state where a power density is reduced. Furthermore, the safety of the energy storage system can be improved by installing the partition between each batter unit module.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail of the exemplary embodiments, with reference to the accompanying drawings. For the sake of brief description with reference to the drawings, the same or equivalent components will be provided with the same reference numbers, and description thereof will not be repeated.

The following details illustrate only the principle behind the present invention. Therefore, although they are not described or illustrated distinctively in the present specification, it is apparent to a person of ordinary skill in the art that various devices and systems can be invented that embody the principle of the present invention and fall within the concept and scope of the present invention. In addition, all conditional terms and embodiments in the present specification are intended, in principle, to help understand the concept of the present invention, and therefore it should be understood that the present invention is not limited to the terms and embodiments that are particularly enumerated in this manner.

In addition, it should be understood that all detailed descriptions of the principle behind the present invention and the embodiments are intended to include all elements of the present invention and their structural and functional equivalents. In addition, it should be understood that the equivalents include not only the well-known equivalents, but also future equivalents, that is, all elements that will be invented in such a manner as to perform the same function as those of the present invention regardless of which structures they have.

Figure 3:
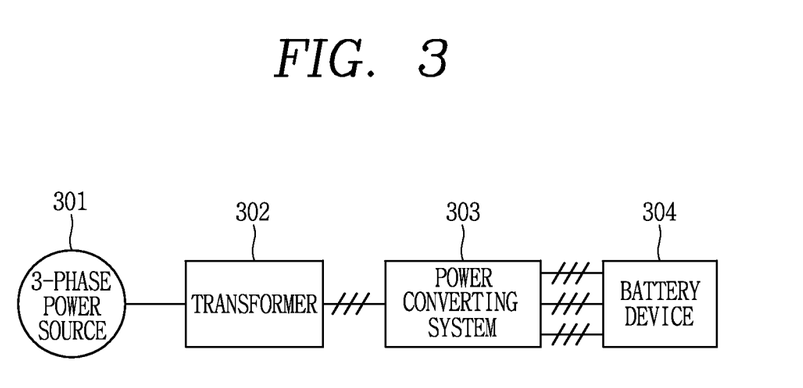
FIG. 3 is an energy storage system according to an embodiment of the invention.
Figure 4:
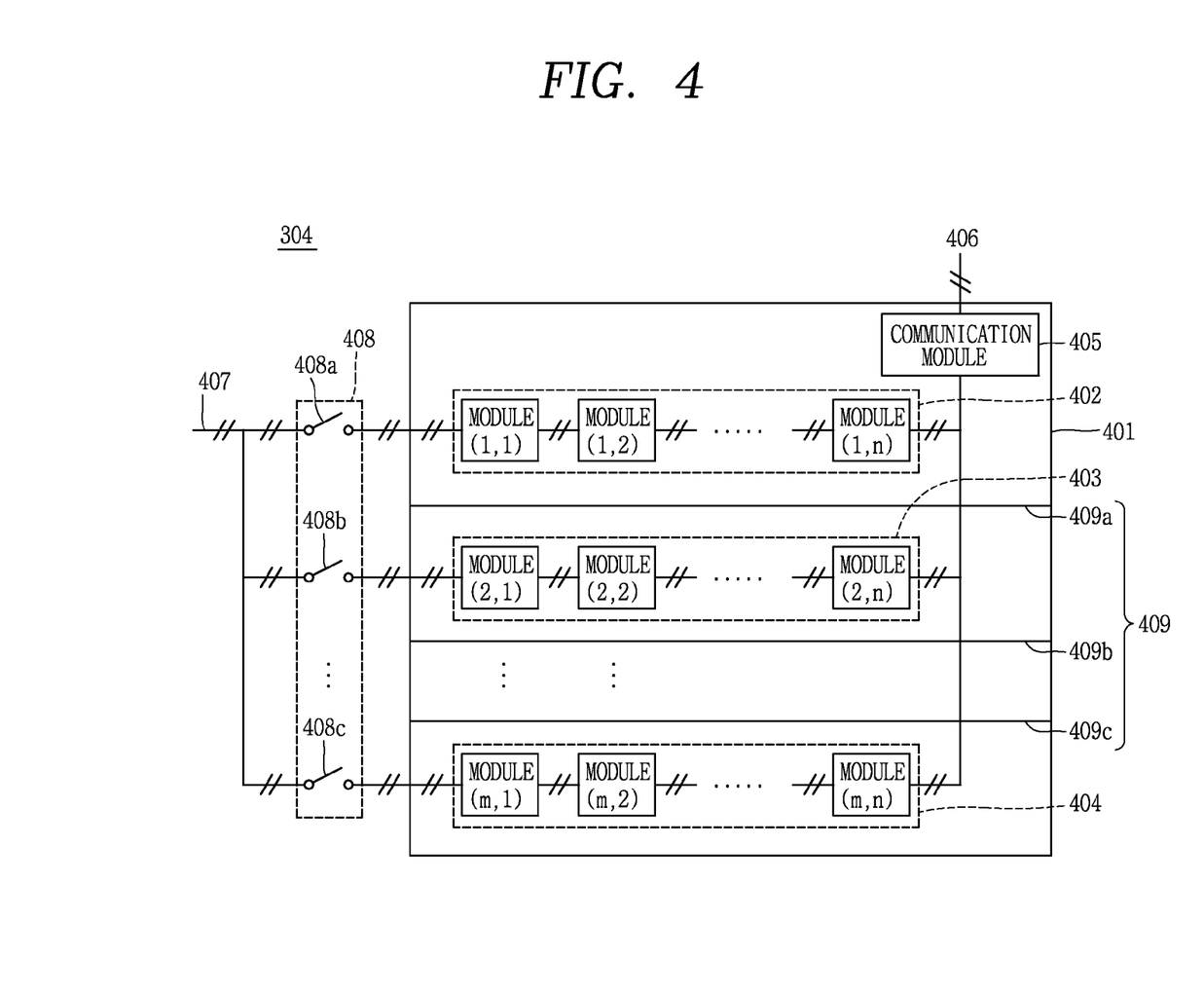
FIG. 4 is a detailed configuration diagram of a battery device illustrated in FIG. 3.

FIG. 3 is an energy storage system according to an embodiment of the invention. FIG. 4 is a detailed configuration diagram of a battery device illustrated in FIG. 3.

Referring to FIG. 3, the energy storage system includes a 3-phase source 301, a transformer 302, and a power converting system 303, and a battery device 304.

The 3-phase source 301 is a 3-phase alternating current power source.

The transformer 302 is for electrical insulation and for changing voltage to different levels. Installation of the transformer 302 is optional.

The power converting system 303 is responsible for performing a power conversion between alternating current 3-phase generation system and the battery device 304.

The battery device 304 stores direct current voltage in a constant range during charging operation or outputs the stored direct current voltage in the constant range during discharging operation.

That is, the 3-phase source 301 is a 3-phase power source that has a line-to-line root mean square (RMS) of 100V or more. In the 3-phase source 301, the presence or absence of the 3-phase power source is optional.

The transformer 302 is for electrical insulation and for changing voltage to different levels. Installation of the transformer 302 is also optional.

The power converting system 303 is a system that performs power conversion between a direct current (DC) power source, which is a battery, and an input 3-phase alternating current (AC) power source, and is configured from a 2 or more-level pulse width modulation (PWM) inverter and an input filter.

The battery device 304 stores or outputs direct current voltage.

In addition, referring to FIG. 4, the battery device 304 includes multiple battery unit modules 402, 404, and 404, a communication module 405, a communication line 406, an electric power line 407, a switch 408, and a partition 409. The multiple battery unit modules 402, 404, and 404 are inserted into a case 401 that makes up a body of the battery device 304. The communication module 405 obtains status information on each of the multiple battery unit modules 402, 403, and 404 and transmits the status information to a high-level system or to a power converting system 303. Over the communication line 406, a communication signal that is transmitted through the communication module 405 is transmitted to the outside. The electric power line 407 is formed between the multiple battery unit modules 402, 403, and 404 and the power converting system 303. The switch 408 is formed on each electric power transmitting path between the electric power line 407 and the multiple battery unit modules 402, 403, and 404. The partition 409 separates the multiple unit modules 402, 403, and 404 from one another.

The multiple battery unit modules 402, 403, and 404 are connected to one another in series or in parallel. Although the multiple battery unit modules 402, 403, and 404 are connected to one another in parallel on the drawings, this is one connection example according to one embodiment. The multiple battery unit modules 402, 403, and 404 may be connected to one another in series or may be connected both in series and in parallel.

Each of the multiple battery unit modules 402, 403, and 404 is configured from multiple battery modules. Each of the multiple battery modules is a module, as one unit, in which multiple battery cells are connected to one another in series or in parallel. The multiple battery modules are connected to one another in series, and thus make up one battery unit module.

That is, the multiple battery cells connected in series or in parallel make up one module, the multiple modules connected in series make up one battery unit module, and the multiple battery unit modules connected in series or in parallel make up the battery device.

The communication module 405 obtains battery-status information on each of the multiple battery unit modules 402, 403, and 404 and transmits the obtained battery-status information to the outside.

At this point, pieces of information, such as a charged state of the battery, an operated state of the battery, the extent with which the battery is discharged are included in the obtained battery-status information.

The communication line 406 serves as a communication path over which the communication signal (for example, the battery-status information) that is generated through the communication module 405 can be transmitted to the outside.

The electric power line 407 connects the multiple battery unit modules 402, 403, and 404, and thus serves as an electric power transmitting path between the power converting system 303 and the multiple battery unit modules 402, 403, and 404).

The switch 408 releases the connection between the power converting system 303 and each of the battery unit modules. At this point, the switch 408 is formed between each of the battery unit modules and the electric power line 407.

That is, the switch 408 includes a first switch 408a, a second switch 408b, and an N-th switch 408c. The first switch 408a is formed between the first battery unit module 402 and the electric power line 407. The second switch 408b is formed between the second battery unit module 403 and the electric power line 407. The N-th switch 408c is formed between the N-th battery unit module 404 and the electric power line 407.

The partition 409 is provided to separate the battery unit modules from one another.

The partition 409 includes a first partition 409a, a second partition 409b, and a third partition 409c. The first partition 409a is formed between the first battery unit module 402 and the second battery unit module 403. The second partition 409b is formed between the second battery unit module 403 and the battery unit module that immediately follows the second battery unit module 403. The third partition 409c is formed between the N-th battery unit module 404 and the (N−1)-th battery unit module.

Through the operation of each of the first to N-th switches 408a to 408c, the power converting system 303 performs a function of supplying to the electric power system a constant amount of electric power that comes from the energy of the battery device 404 or of charging the battery with the energy of the electric power system.

At this point, if the 3-phase generation system of the 3-phase source 301 operates properly, the power converting system 303 properly follows a phase angle of the electric power system and thus outputs the same frequency and the same level of voltage as in the electric power system. Thus, the battery device 304 is discharged to supply the energy to the electric power system or the battery device 304 is charged to absorb the energy of the electric power system.

In this case, it is considered that the energy storage apparatus including the power converting system 303 and the battery device 304 is configured as one current source equivalent circuit.

In addition, if the 3-phase generation system of the 3-phase source 301 is absent, the power converting system 303 operates as a voltage source that outputs a constant voltage and a constant frequency. If an additional energy source is absent in a system in which the 3-phase generation system is not present, the battery device 304 performs only a function of making the energy discharge, and may further include a device for charging the battery in an external manner.

At this point, the energy storage apparatus including the power converting system 303 and the battery device 304 operates as the voltage source.

The power converting system 303 may include an input filter, such as an L filter, an L-C filter, or an L-C-L filter, and may possibly be configured from a 3-phase 2-level PWM inverter or a 3-phase 3-level PWM inverter.

The battery device 304 outputs the direct current voltage in a constant range and transmits pieces of information, such as a charged state of the battery, an operated state of the battery, and the extent with which the battery is discharged, to an energy management apparatus of a high-level control system or to the power converting system 303 through the communication module 405. Thus, a charged/discharged state of the battery device 304 is determined depending on an energy state of the battery.

At this point, if a sign of disorder occurs in the battery device 304, the switch 408 is opened by the energy management apparatus or the power converting system 303, and thus separates the power converting system 303 and a specific battery unit module included within the battery device 304 from each other.

That is, the switch 408 is formed between the power converting system 303 and each of the battery unit modules.

Accordingly, when the battery unit module in which the disorder occurs is among the multiple battery unit modules, the switch formed between the battery unit module in which the disorder occurs and the power converting system 303 is opened, thereby stopping only the operation of the battery unit module in which the disorder occurs.

At this point, as described above, since the battery unit module in which the disorder occurs is separated by the partition 409 from the other battery unit modules, the disorder has no effect on operations that are performed by battery unit modules other than the battery unit module in which the disorder occurs.

In addition, even though the battery unit module in which the disorder occurs is not among the multiple battery unit modules, the switch is controlled in such a manner as to change the level of the voltage that is to be supplied to the power converting system 303.

On the other hand, according to the embodiment of the present invention, the number of the switches included in the switch 408 is determined by the number of the battery unit modules included within the battery device 304. At this point, the arrangement of the switches included in the switch 408 described above provides a construction in which connections are established, in parallel, between the power converting system 303 and the battery device 304.

Thus, this makes it possible for the switches to have less breaking capacity than the switch 208 illustrated in FIG. 2. The capacity of the switch 408 is differently calculated than the switch 208 illustrated in FIG. 2, as described below.

In the case of the switch 208 illustrated in FIG. 2, a capacity of the switch 208 is calculated according to a level of a final output voltage that is applied to the electric power line 207 and an amount of electric current flowing between the battery device 104 and the power converting system 103. On the other hand, capacity of the switch 408 according to the embodiment of the present invention is possible to calculate from a level of a voltage being applied to each battery unit module and an amount of electric current flowing through each battery unit module.

Particularly, if the battery unit modules are similar in voltage level to one another, because an amount of electric current for a break is reduced, the switch is easier to select than that in the related art.

In addition, when an abnormality occurs in any one of the battery unit modules, because an opening operation is performed on the switch illustrated in FIG. 2, the operation of the entire system comes to a stop. However, according to the embodiment of the present invention, the switch is installed between each of the battery unit modules and the power converting system 303. Accordingly, if the abnormality occurs in each of the battery unit modules, because only the battery unit module in which the abnormality occurs is eliminated from the battery device, this provides an effect in which the operation is performed without any hitch even when the abnormality occurs in each of the battery unit modules. In this case, because a capacity of the entire battery is reduced, this reduction is taken into consideration in performing the operation.

In addition, the communication module 405 has to transmit the information on each of the battery unit modules to the high-level energy management apparatus or to the power converting system 303.

Accordingly, the partition 409 serves a function of increasing the stability when the abnormality occurs in the battery unit module, and thus only the battery unit module in which the abnormality occurs is separated from the other battery unit modules within the battery device 304.

Figure 5:
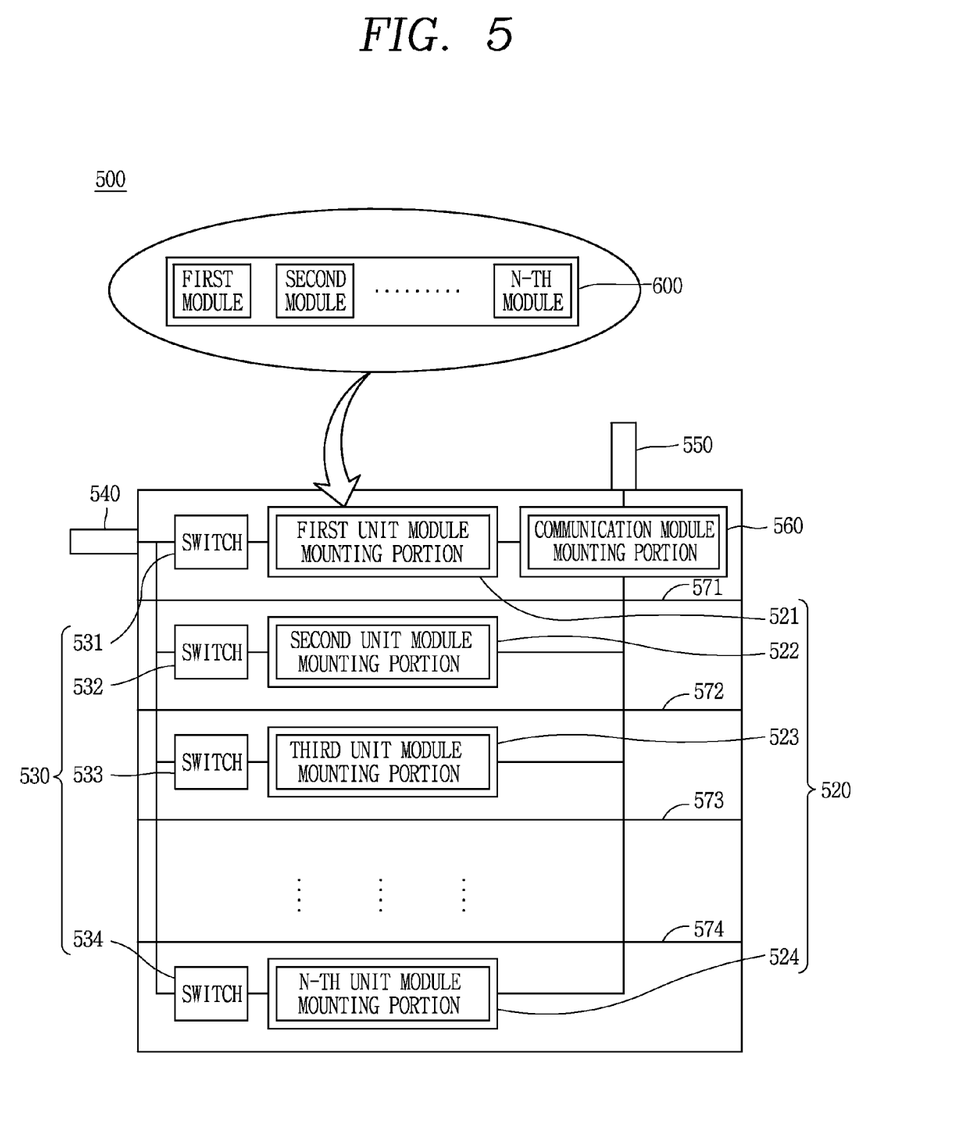
FIG. 5 is a diagram for describing a configuration of a battery device according to another embodiment of the present invention.

FIG. 5 is a diagram for describing a configuration of a battery device according to another embodiment of the invention.

Referring to FIG. 5, a battery device 500 includes a case 510, a unit module mounting portion 520, a switch 530, an electric power terminal 540, a communication terminal 550, a communication module mounting portion 560, and multiple partitions 571, 572, 573, and 574 (hereinafter collectively referred to as a partition '570').

The case 510 forms an external appearance of the battery device (including the battery devices illustrated in FIGS. 3 and 4).

Multiple accommodation spaces are formed in the case 510 and the unit module mounting portion 500 is formed in each of the accommodation spaces. The unit module mounting portion 520 includes a first unit module mounting portion 521, a second unit module mounting portion 522, a third unit module mounting portion 523, and an N-th unit module mounting portion 524.

A battery unit module 600 is installed within each of the unit module mounting portions 521, 522, 523, and 524. At this point, as the case may be, the battery unit module 600 may be installed or may be installed within one or more of the unit module mounting portions 521, 522, 523, and 524.

At this point, the unit module mounting portions 521, 522, 523, and 524 are separated, by the partition 570, from one another.

That is, the first unit module mounting portion 521 and the second unit module mounting portion 522 are separated, by the first partition 571, from each other.

In addition, the second unit module mounting portion 522 and the third unit module mounting portion 523 are separated, by the second partition 572, from each other.

In addition, the third unit module mounting portion 523 and the unit module mounting portion that immediately follows the third unit module mounting portion 523 are separated, by the third partition 573, from each other.

In addition, the N-th unit module mounting portion 524 and the (N−1)-th unit module mounting portion are separated, by the N-th partition 574, from each other.

The electric power terminal 540 is connected to the unit module mounting portion 520. Accordingly, electric power that is generated through the power converting system 303 is transmitted to the unit module installation module 520, or electric power that is generated through the battery unit module that is installed within the unit module mounting portion 520 is transmitted to the power converting system 303.

At this point, the switch 530 is arranged between the electric power terminal 540 and each of the battery unit module mounting portions 521, 522, 523, and 524. It is desirable that a switch mounting portion be formed between the electric power terminal 540 and each of the battery unit module mounting portions 521, 522, 523, and 524 and that the switch 530 described above be arranged within the switch mounting portion.

The switch 530 establishes or releases a connection between each of the battery unit module mounting portions 521, 522, 523, and 524 and the electric power terminal 540.

To do this, the switch 530 includes a switch 531, a switch 532, a switch 533, and a switch 534. The switch 531 is formed between the first unit module mounting portion 521 and the electric power terminal 540. The switch 532 is formed between the second unit module mounting portion 522 and the electric power terminal 540. The switch 533 is formed between the third unit module mounting portion 523 and the electric power terminal 540. The switch 534 is formed between the N-th unit module mounting portion 524 and the electric power terminal 540.

Each of the switches 531, 532, 533, and 534 is formed between each of the unit module mounting portions 521, 522, 523, and 524 and the electric power terminal 540, and establishes or releases the connection between the electric power terminal 540 and each of the unit module mounting portions 521, 522, 523, and 524.

The communication module 405 is installed within the communication module mounting portion 560. The communication module mounting portion 560 is connected to each of the unit module mounting portions 521, 522, 523, and 524, and makes it possible to obtain the status information on the battery unit module installed within each of the unit module mounting portions 521, 522, 523, and 524.

In addition, the communication module mounting portion 560 is connected to the communication terminal 550 and makes it possible to transmit the information obtained through the communication module 405 to the outside through the communication terminal 550.

According to the embodiment of the present invention, the battery is divided into modules in terms of capacity for installation, and the switch or the breaker is installed for each of the modules. Thus, even though the disorder occurs in a specific battery unit module included in the battery device, the operation of the energy storage system can operate without any hitch in a state where a power density is reduced. Furthermore, the safety of the energy storage system can be improved by installing the partition between each batter unit module.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A battery device comprising:
a case;
an electric power terminal formed on one side of the case;
a plurality of partitions forming a plurality accommodation spaces in the case;
a plurality of battery unit modules including a plurality of battery modules connected in series, each of the plurality of battery modules including a plurality of battery cells connected in series or in parallel;
a plurality of unit module mounting portions formed within the case, each configured to detachably accommodate one of the plurality of battery unit modules; and
a plurality of switch mounting portions, each formed between the electric power terminal and one of the plurality of unit module mounting portions and including a switch configured to establish a connection between the electric power terminal and a corresponding unit module mounting portion, wherein one of the plurality of unit module mounting portions and the corresponding switch mounting portion are arranged in each of the plurality of accommodation spaces, and wherein each of the plurality of unit module mounting portions and the corresponding switch mounting portion are separated from other of the plurality of unit module mounting portions and the corresponding switch mounting portions by one of the plurality of partitions.

2. The battery device of claim 1, wherein the switch within each of the plurality of switch mounting portions is formed between the electric power terminal and the corresponding unit module mounting portion and connects or disconnect lines over which electric power is transmitted and received between the electric power terminal and the corresponding unit module mounting portion.

3. The battery device of claim 1, further comprising:
   at least one communication module mounting portion formed within the case and configured to accommodate a communication module; and
   a communication terminal formed within the case and configured to be connected to the at least one communication module mounting portion.

4. The battery device of claim 3, wherein the at least one communication module mounting portion is connected to each of the plurality of unit module mounting portions to form a communication path.

5. An energy storage system comprising:
   a plurality of battery unit modules including a plurality of battery modules connected in series, each of the plurality of battery modules including a plurality of battery cells connected in series or in parallel;
   a plurality of unit module mounting portions formed within a case, each configured to detachably accommodate one of the plurality of battery unit modules;
   a plurality of partitions forming a plurality of accommodation spaces in the case;
   a battery device configured from the plurality of the battery unit modules; and
   a power converting system configured to be connected to the battery device and to convert electric power applied between an electric power system and the battery device,
   wherein the battery device includes a plurality of switches, each configured to establish a connection between a corresponding one of the plurality of battery unit modules and the power converting system, and
   wherein one of the plurality of unit module mounting portions and a corresponding switch mounting portion are arranged in each of the plurality of accommodation spaces, and
   wherein each of the plurality of unit module mounting portions and the corresponding switch mounting portion are separated from other of the plurality of unit module mounting portions and the corresponding switch mounting portions by one of the plurality of partitions.

6. The energy storage system of claim 5, wherein the battery device is connected to the plurality of battery unit modules and includes a communication module configured to obtain battery-status information related to each of the plurality of battery unit modules and transmit the obtained battery-status information externally.

7. The energy storage system of claim 6, wherein the power converting system is further configured to:
   receive the obtained battery-status information; and
   control states of the plurality of switches based on the battery-status information.

8. The energy storage system of claim 7, wherein the power converting system is further configured to open a switch that is connected to one of the plurality of battery unit modules in which a sign of disorder occurs.

9. The energy storage system of claim 5, wherein each of the plurality of switches is formed between the electric power system and the corresponding unit module mounting portion and connects or disconnect lines over which the electric power is transmitted and received between the electric power system and the corresponding unit module mounting portion.

10. The energy storage system of claim 5, further comprising:
   at least one communication module mounting portion formed within the case and configured to accommodate a communication module; and
   a communication terminal formed within the case and configured to be connected to the at least one communication module mounting portion.

11. The energy storage system of claim 10, wherein the at least one communication module mounting portion is connected to each of the plurality of unit module mounting portions to form a communication path.

12. The battery device of claim 3, wherein the at least one communication module is further configured to obtain battery-status information related to each of the plurality of battery unit modules and transmit the obtained status information externally.

13. The battery device of claim 12, wherein states of the plurality of switches are controlled based on the battery-status information.

* * * * *